United States Patent
Aschauer et al.

(10) Patent No.: US 10,715,517 B2
(45) Date of Patent: Jul. 14, 2020

(54) RETRIEVAL DEVICE FOR AUTHENTICATION INFORMATION, SYSTEM AND METHOD FOR SECURE AUTHENTICATION

(71) Applicant: SIEMENS AKTIENGESELLSCHAFT, München (DE)

(72) Inventors: Hans Aschauer, München (DE); Steffen Fries, Baldham (DE); Markus Heintel, München (DE); Wolfgang Klasen, Ottobrunn (DE); Axel Pfau, München (DE); Franz Sperl, Oberviechtach (DE); Georg Trummer, Amberg (DE); Johannes Zwanzger, Neubiberg (DE); Rainer Falk, Poing (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 16/388,417

(22) Filed: Apr. 18, 2019

(65) Prior Publication Data

US 2019/0334891 A1 Oct. 31, 2019

(30) Foreign Application Priority Data

Apr. 25, 2018 (EP) .................... 18169254

(51) Int. Cl.
  *H04L 29/06* (2006.01)
  *H04W 12/00* (2009.01)
  *H04B 10/116* (2013.01)

(52) U.S. Cl.
  CPC ........ *H04L 63/0853* (2013.01); *H04B 10/116* (2013.01); *H04W 12/00504* (2019.01)

(58) Field of Classification Search
  CPC ......... H04L 63/0853; H04W 12/00504; H04B 10/116
  See application file for complete search history.

(56) References Cited

U.S. PATENT DOCUMENTS 6,450,677 B1 * 9/2002 Knauer .................... B60Q 7/00
                                                      362/511
8,300,811 B2   10/2012 Georgiades et al.
(Continued)

FOREIGN PATENT DOCUMENTS

EP   2239919 A1   10/2010
EP   2493230 A1    8/2012
(Continued)

OTHER PUBLICATIONS https://agses.net/how-agses-works-simple-andsecure/; 2018.
https://agses.net/the-agses-technology/three-basic-components/flicker-code-generator/; 2018.

*Primary Examiner* — Simon P Kanaan
*Assistant Examiner* — Nhan Huu Nguyen
(74) *Attorney, Agent, or Firm* — Schmeiser, Olsen & Watts LLP

(57) ABSTRACT

A retrieval device for secure retrieval of optical information for a first device from a light source of a second device includes, a housing made from at least one material which is opaque for the light emitted from the light source. The housing is arranged to contain the light from at least a part of the light source. The retrieval device includes an attachment adapted to detachably attach the housing to the second device, a light receiver arranged to receive optical information from the light source, said light receiver located inside the housing, and a connector arranged to transfer an optical and/or electrical signal from the light receiver to the first device.

14 Claims, 3 Drawing Sheets

(56) References Cited

U.S. PATENT DOCUMENTS

Figure 1:
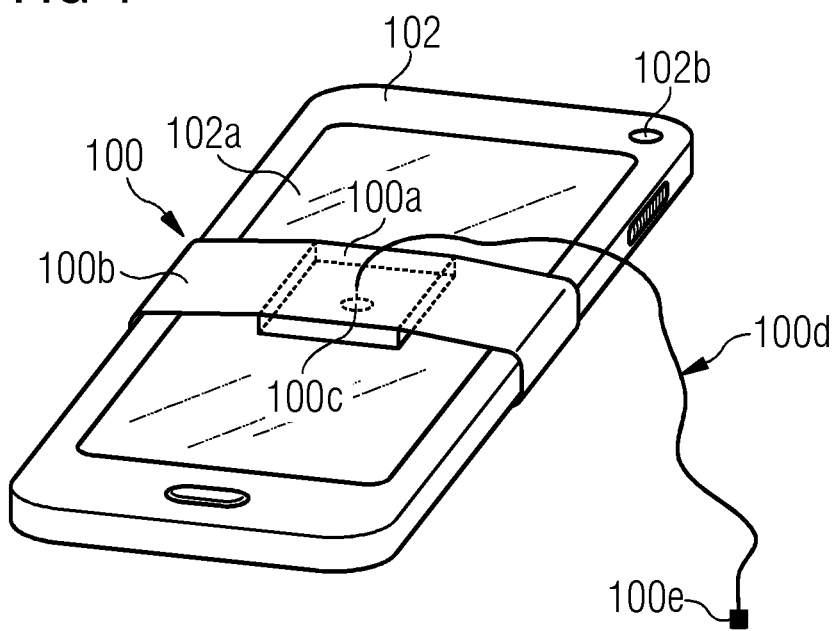

| | | |
|---|---|---|
| 8,531,247 B2 | 9/2013 | Dichtl |
| 8,843,761 B2 | 9/2014 | Meyer et al. |
| 8,892,616 B2 | 11/2014 | Dichtl |
| 9,147,088 B2 | 9/2015 | Falk et al. |
| 9,584,311 B2 | 2/2017 | Meyer et al. |
| 9,843,385 B2* | 12/2017 | Deyle ............... H04B 10/116 |
| 9,853,730 B2* | 12/2017 | Mueller ............. H04B 10/116 |
| 10,135,528 B2* | 11/2018 | Tsonev ............. H04B 10/116 |
| 10,270,528 B1* | 4/2019 | Amacker ............ H04W 4/02 |
| 2007/0058835 A1* | 3/2007 | Schrijen ............ H04N 1/32101 382/100 |
| 2008/0210849 A1* | 9/2008 | Sherazi ............. H04B 10/69 250/214 R |
| 2010/0219234 A1* | 9/2010 | Forbes .............. G06Q 10/02 235/375 |
| 2010/0232799 A1* | 9/2010 | Lueck ............... H04B 10/1149 398/118 |
| 2012/0310715 A1* | 12/2012 | Singhal ............. G06Q 30/02 705/14.1 |
| 2012/0326998 A1* | 12/2012 | Baentsch ........... G06F 21/83 345/173 |
| 2013/0132541 A1* | 5/2013 | Falk ................ G06Q 10/087 709/222 |
| 2013/0156180 A1 | 6/2013 | Hess |
| 2014/0122884 A1 | 5/2014 | Pieczul et al. |
| 2014/0208387 A1* | 7/2014 | Ganesh ............. H04W 12/04 726/4 |
| 2014/0230071 A1* | 8/2014 | Adam ............... G06F 21/60 726/26 |
| 2014/0279493 A1* | 9/2014 | Kamath ............. H04L 63/08 705/43 |
| 2015/0071438 A1 | 3/2015 | Lambert |
| 2015/0076989 A1* | 3/2015 | Walma .............. H05B 47/11 315/149 |
| 2015/0086211 A1* | 3/2015 | Coffey ............. H04B 10/40 398/116 |
| 2015/0264080 A1 | 9/2015 | Busser et al. |
| 2015/0305086 A1* | 10/2015 | Uttley .............. B62B 1/12 280/652 |
| 2015/0341343 A1 | 11/2015 | Dichtl et al. |
| 2015/0371214 A1* | 12/2015 | Schroder ........... H04L 63/0838 705/44 |
| 2016/0087726 A1* | 3/2016 | Roberds ............ G02B 6/3816 398/105 |
| 2016/0253438 A1 | 9/2016 | Boffgen et al. |
| 2016/0254864 A1* | 9/2016 | Mueller ............ H05B 47/19 398/118 |
| 2016/0284171 A1* | 9/2016 | Ao ................. G08B 5/36 |
| 2016/0352716 A1* | 12/2016 | Hatta .............. H04W 12/06 |
| 2017/0046950 A1* | 2/2017 | Pederson .......... H05B 45/10 |
| 2017/0059763 A1* | 3/2017 | Lucrecio .......... H04B 10/27 |
| 2017/0103647 A1* | 4/2017 | Davis ............. H04W 12/0608 |
| 2017/0237565 A1* | 8/2017 | Rommel ............ H04L 9/14 713/171 |
| 2018/0013496 A1* | 1/2018 | Liu ............... H04B 10/60 |

FOREIGN PATENT DOCUMENTS

| | | |
|---|---|---|
| EP | 2870565 A1 | 5/2015 |
| EP | 2891102 A1 | 7/2015 |
| EP | 2605445 B1 | 9/2015 |
| EP | 2976707 B1 | 2/2017 |
| EP | 17175275 | 6/2017 |
| EP | 3028140 B1 | 8/2017 |
| WO | 2017137256 A1 | 8/2017 |

* cited by examiner

RETRIEVAL DEVICE FOR AUTHENTICATION INFORMATION, SYSTEM AND METHOD FOR SECURE AUTHENTICATION

CROSS-REFERENCE TO RELATED APPLICATIONS

This application claims priority to EP Application No. 18169254.2, having a filing date of Apr. 25, 2018, the entire contents of which are hereby incorporated by reference.

FIELD OF TECHNOLOGY

The following relates to secure authentication and retrieval devices for the retrieval of authentication information.

BACKGROUND

Encryption devices are used to send and receive data communication via open networks and to secure this communication against manipulation, monitoring, and/or interception. An encryption device may protect the data communication against manipulation by using cryptographic check sums (message authentication code, digital signatures) or by using an authenticated encryption mode, protecting the integrity of sent and received data communication and ensuring the authenticity of communication peers. An encryption device may cryptographically protect only the integrity of data communication by using an integrity-only ciphersuite. It may protect the confidentiality of data communication by encrypting/decrypting the data. An encryption device may protect both the integrity and the confidentiality of data communication. Many industrial field devices require a security configuration, for example for connection to a remote entity, for example a remote network, like a virtual private network (VPN) access device. In other field devices an authentication of a user can be required, for example for service access to a medical imaging device.

Establishment and/or activation of such a security configuration and/or authentication of a user is known to be possible by several means, for example: explicit configuration by an administration interface, loading of a configuration from a configuration memory module, loading of a configuration from a configuration server, auto-configuration (so-called "plug and work"). Furthermore, training is known from methods such as pairing, teach-in, Wi-Fi Protected Setup (WPS) from application fields such as Bluetooth and Wi-Fi connections. In such cases, the security configuration is trained for example upon a first activation of a device or upon a keypress. Training can be protected by different methods. For example, training can be only possible in a short time interval following a keypress of a device. Protection can also be provided by other technical measures. For example, a personal identification number (PIN) or password has to be entered by user or a PIN is checked by the device in another form.

In the field of on-line banking services, so-called "flicker-codes" are known. An example for such a flicker-code based system may be found here: https://agses.net/the-agses-technology/three-basic-components/flicker-code-generator/, retrieved Apr. 12, 2018, https://agses.net/how-agses-works-simple-and-secure/, retrieved Apr. 12, 2018.

In a flicker-code based authentication procedure, security code is optically modulated and displayed on a screen. Displaying on the screen can be achieved by using images on a web page, which are displayed by screen. A receiving device is then used to receive flicker code and decode it. To this end the receiving device must be held by a user against the screen displaying the flicker code at a given angle.

Entering a PIN can be a cumbersome task, requiring at least one hand of the user. While PINs with a larger number of digits provide an elevated level of security (at least when different digits are used), the length of PINs is limited in practice, as longer PINs increase the risk of wrong input by the user and are inconvenient for a user to enter. Similar to PINs, also a password or another authentication code may be used. String passwords or authentication codes, e.g., a hexadecimal authentication code, are tedious to enter, in particular on devices without an alphanumeric keyboard.

On the other hand, flicker codes may be recorded by an attacker by observing the screen on which they are displayed, giving a possibility for attacks. The correct detection of the flicker code by the receiving device may depend upon environmental conditions, e.g. the illumination of the screen by other light sources. Also, holding the receiving device at the required angle for detection requires the attention of the user and may be cumbersome or even impractical in some applications, for example if field devices have a screen in inconvenient location for authentication or no screen at all.

The document U.S. Pat. No. 8,531,247 B2, the document the document U.S. Pat. No. 8,892,616 B2, the document U.S. Pat. No. 8,300,811 B2, the document U.S. Pat. No. 9,147,088 B2, the document U.S. Pat. No. 9,584,311 B2, the document EP 2976707 B1, the document EP 2 605 445 B1, the document EP 2 870 565 A1, the document EP 2 891 102 A1, the document WO 2017137256 A1, the document EP 2870565 B1, the document EP 3028140 B1, the document EP 17175275, and the document U.S. Pat. No. 8,843,761 B2 are known from art.

From different field it is known to use suction cups as attachment to detachably attach mechanical hooks, for example towel holders, to tiles, or GPS navigation systems to windshields in cars.

SUMMARY

Therefore, there is a need to make a required security configuration for a first device easier and faster for the user, more secure, and more reliable.

According to an embodiment, a retrieval device for secure retrieval of optical information for a first device from a light source of a second device is provided, comprising: a housing, made from at least one material, which is opaque for the light, emitted from the light source, wherein the housing is arranged to contain the light from at least a part of the light source.

In addition, the retrieval device comprises an attaching means or attachment adapted to detachably attach the housing to the second device.

The retrieval device further comprises a light receiver arranged to receive optical information from the light source, said light receiver located inside the housing.

The retrieval device further comprises a connection means or connector, arranged to transfer an optical and/or electrical signal from the light receiver (100c) to the first device.

According to an embodiment, a method of secure authentication at a first device is provided. The method comprises: detecting, by a second device, that a retrieval device is connected to a light source and controlling, by the second device, an emission of light encoding information, wherein the information comprises an authentication code for the first device.

According to an embodiment, a system is provided. The system comprises a retrieval device according to one of the embodiments described above or below, a first device and a second device.

It is to be understood that the features mentioned above and features yet to be explained below can be used not only in the respective combinations indicated, but also in other combinations or in isolation, without departing from the scope of embodiments of the present invention. Features of the above-mentioned aspects and embodiments may be combined with each other in other embodiments.

BRIEF DESCRIPTION

Figure 2:
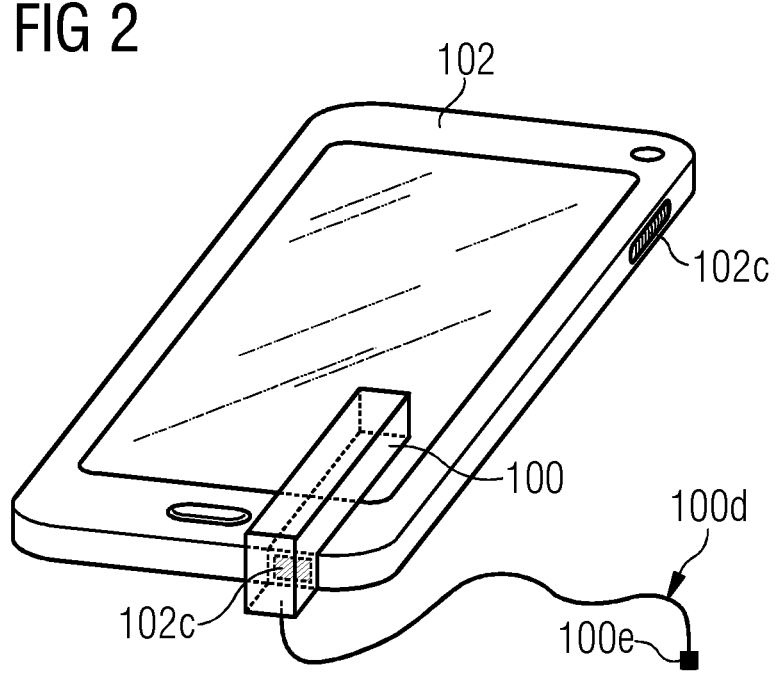
Figure 3:
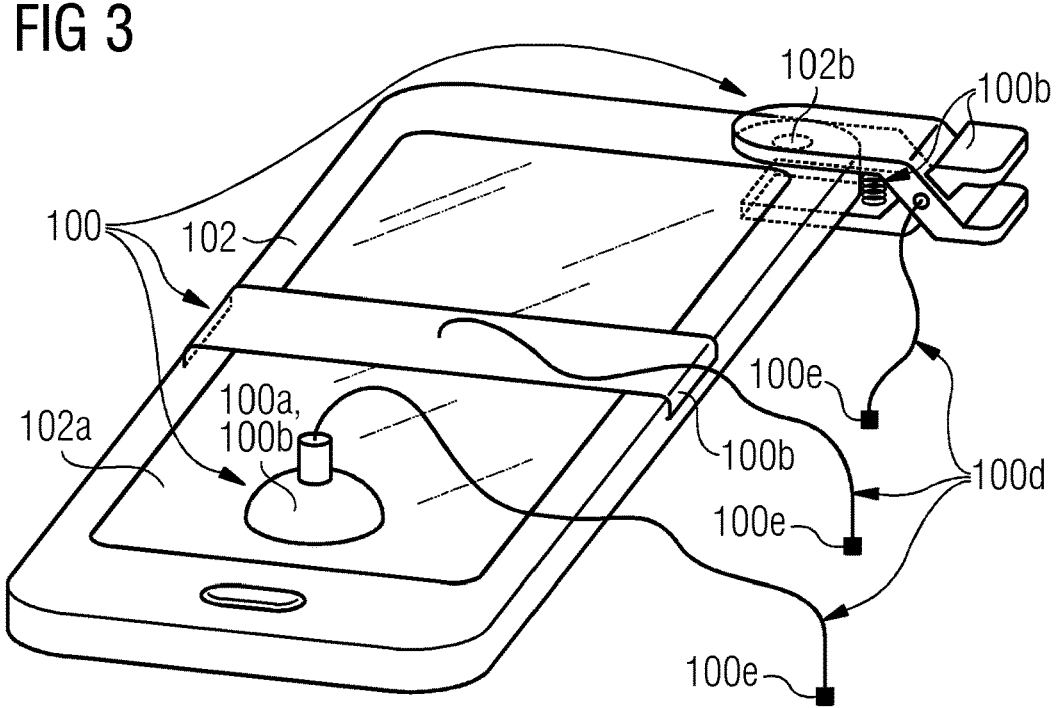
Figure 4:
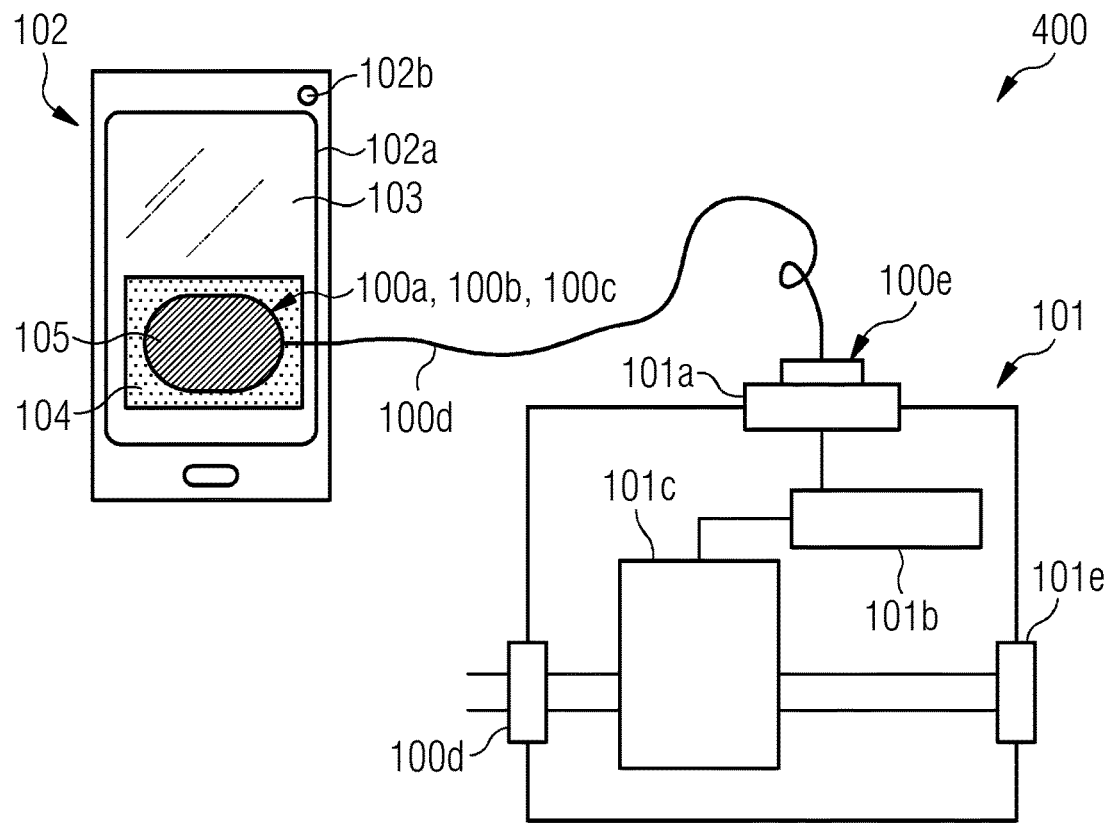
Figure 5:
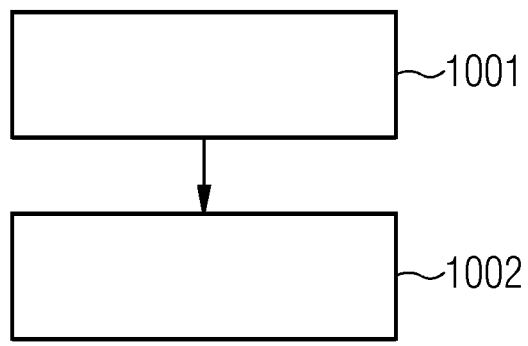
Figure 6:
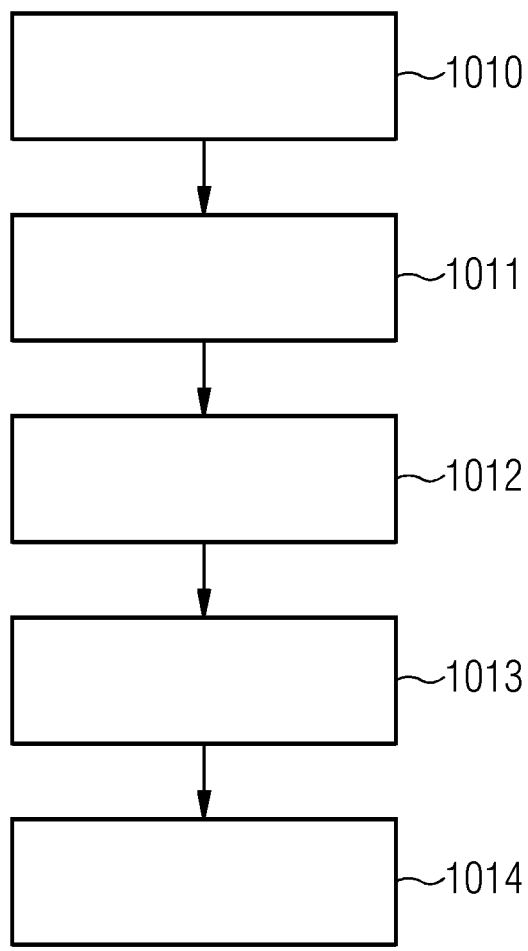

Some of the embodiments will be described in detail, with reference to the following figures, wherein like designations denote like members, wherein:

FIG. 1 schematically illustrates a retrieval device according to various examples;

FIG. 2 schematically illustrates retrieval devices according to various examples;

FIG. 3 schematically illustrates retrieval devices according to various examples;

FIG. 4 schematically illustrates a system according to various examples;

FIG. 5 is a flowchart of a method of secure authentication at a first device according to various examples; and FIG. 6 is a flowchart of a method according to various examples.

DETAILED DESCRIPTION

In the following, embodiments of the invention will be described in detail with reference to the accompanying drawings. It is to be understood that the following description of embodiments is not to be taken in a limiting sense. The scope of embodiments of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Generally, the techniques described herein may find application in various kinds and types of security-critical or safety-critical systems. For example, the techniques described herein may find application in the user access control for field device, for example a medical device in a hospital, like an Magnetic resonance imaging (MRI) or Computed tomography (CT) device or for a network connection node, for example VPN access unit which allows the access of the local network in a manufacturing plant in a first country to a private network in central location of the company, for example the headquarters in a second country, or an automation device.

FIG. 1 schematically illustrates a retrieval device according to various examples. FIG. 2 and FIG. 3 schematically illustrate retrieval devices according to various examples.

An embodiment of the retrieval device 100a-e for secure retrieval of optical information for a first device is shown in FIG. 1. Further embodiments of the retrieval device 100 are shown in FIG. 2 and FIG. 3, wherein identical reference signs denote identical or functionally equivalent or related elements.

The retrieval device 100 retrieves optical information from a light source 102a, 102b of a second device 102. In the embodiment shown in FIGS. 1, 2, and 3, the second device 102 is a mobile phone, which has the following controllable light sources: a touchscreen 102a, an LED 102b and a flashlight (on the backside, not shown). However, other light sources may be used.

The second device 102 can be any kind of mobile entity used by a person for his or her personal communication, e.g. a cellular phone, a mobile station, a PDA type of device like laptop, notebook, notepad, tablet, etc.

The retrieval device 100a-e comprises a housing 100a, which is made from at least one material, which is opaque for the light emitted from the light source 102a, 102b. In the embodiment of FIG. 1, the housing has a box-like shape and in some embodiments is made of plastic. However, many other materials, which are opaque for the light spectrum emitted from the light source, for example light in the visible range, are conceivable, for example metals, cardboard, wood, ceramics, rubber and material composites. The housing 100a is arranged to contain the light from at least a part of the light source 102a, 102b. In the embodiment of FIG. 1, the housing has a flat shape, which allows the housing to have a light-tight fit with the screen 102a, so that no light emitted in the region of the screen 102a which is covered by the housing 100a may escape.

This can have the effect that the optical information, which can be used for secure authentication, may be contained within the housing, protecting against monitoring of the light by an attacker.

The retrieval device further comprises an attaching means or attachment 100b adapted to detachably attach the housing 100a to the second device 102. The attaching means or attachment are arranged to detachably attach to the display screen 102a. In the embodiment of FIG. 1, the attaching means or attachment 100b is a rubber band, which may be wrapped around phone to securely fasten the housing 100a in a fixed position on the display 102a. Many embodiments using rubber elements in various shapes are conceivable. FIG. 2 and FIG. 3 show various other examples for attaching means or attachment; however, many other attaching means or attachment are conceivable. In the example of FIG. 2, a magnet 102c, a ferromagnetic material 102c, or a hook and loop fastener 102c is provided by the mobile phone or by a case of the mobile phone. The retrieval device 100 comprises attaching means or attachment. For example a ferromagnetic plate, for example made from ferromagnetic steel, to attach to the magnet 102c. The magnet 102c can be a magnet provided at a plug of the mobile phone for a magnetic connection of a charging device.

The retrieval device 100 itself may also comprise a magnet to attach to a ferromagnetic material 102c, which is part of the mobile device or the casing of the mobile device. In further embodiments, 102c is a hook and loop fastener and the attaching means or attachment of the retrieval device comprise a matching hook and loop fastener.

FIG. 3 shows three different retrieval devices 100. In FIG. 3, the retrieval devices are shown simultaneously attached to the mobile phone 102. However, as in FIG. 1 and FIG. 2, only one retrieval device is in use at one point in time and/or through the authentication. In FIG. 3, various different examples of attaching means or attachment 100b can be seen, which includes a suction means or suction, for example a suction cup, an elastic element which snaps onto the shape of the mobile phone 102 as for example known from mobile phone covers, and a clamping element which comprises a spring element.

The attaching means or attachment may have the effect that the connection point between the housing 100a and light source 102a, 102b allows no light or just minuscule amount of light to escape, thereby contributing to the protection against unauthorized retrieval of optical information and the robustness of the authentication against environmental influences, e.g. direct sunshine or flashing of laser flash lamps in a laboratory environment.

It is possible, that at least a part of at least one of the housing 100a and the attaching means or attachment 100b is made of a flexible material. This may have the positive effect that an even tighter seal, suppressing the release of light to the outside of the housing 100a may be achieved by deformation of the flexible material. For example, the housing 100a in FIG. 1 may comprise a rim that acts like a gasket, for example made of rubber. This may have the further advantage to securely attach the retrieval device 100 in place, so that it does not move even as acceleration forces, for example due to vibrations, occur. It also contributes to no or only miniscule amounts of light escaping from the housing.

At least a part of the attaching means or attachment is made of a material that is detectable by a touchscreen upon contact. This may have the advantage, that the second device 102, for example the mobile phone 102, can detect the presence of the retrieval device. The detection of the presence of the retrieval device may be used to control the authentication as will be explained further below.

The retrieval device further comprises a light receiver 100c. The light receiver is arranged to receive optical information from the light source 102a, 102b. There are many options for a light receiver known to a person skilled in the art. The light receiver may for example consist of a simple element like a coupling element for an optical fiber, or just be an optical fiber. It may also comprise electronic elements, like a photodetector, for example a photodiode. It may also comprise more complex arrangements, like a fiber array, an imaging fiber array, an array of photodiodes, or camera.

The light receiver 100c is located inside the housing 100a, so that the optical information may be received by the light receiver 100c while no light is released to the surrounding environment.

The retrieval device further comprises a connection means or connector (100d, 100e) arranged to transfer an optical and/or electrical signal from the light receiver (100c) to the first device (101).

The connection means or connector 100d, 100e comprise an optical fiber 100d comprising a first end and a second end, where the first end is the light receiver and the second end 100e is adapted to be coupled to the first device. The second end comprises a connector for the optical fiber 100e, for example a SubMiniature Assembly SMA905 connector, or a different connector.

In case an electronic signal is transferred, 100d may comprise electrically conducting wires and 100e may be any type of connector, including a custom-made connector. The connection means or connector may also comprise a combination of optical and electronic components, for example wires to provide electrical power for a detection circuit placed inside the housing 100a, as well as an optical fiber to transfer an optical signal from the detection circuit.

FIG. 4 schematically illustrates a system according to various examples.

The system 400 comprises a retrieval device 100 as described above. The system 400 further comprises a first device 101, and a second device 102.

The second device can be the second device 102 described above. The second device can be a different mobile device, for example an authentication device built for the purpose of authentication, a tablet computer or a laptop. Many of the devices suited to act as the second device 102 are conceivable and known to the person skilled in the art.

In the example of FIG. 4, the second device 102 is a mobile phone.

The example of FIG. 4, the first device 101 is a virtual private network gateway (VPN gateway) which comprises a connector 101a which is coupled to a security configuration entity SE 101b, an encryption/decryption unit 101c and an internal Ethernet connection 101e and an external Ethernet connection 100d. The first device 101 may provide a virtual access to a protected network via an external network connected at 100d for an internal network connected at 101e if a successful authentication is provided to the security configuration entity SE 101b via the connector 101a.

The system 400 may have the advantage that the secure authentication of the first device 101 may be performed by the second device 102 and the information may be securely transferred without the need of manual input by the retrieval device 100. In the example shown in FIG. 4 this may have the further advantage that no input means or input for a user, like a keyboard, is required at the VPN gateway. In addition, the security is increased as the attack surface is reduced, as the user has no access to the secure information used to authenticate the VPN gateway 101 to the VPN network. In addition, the comfort for the user may be increased, as the need to type-in the secure information is eliminated from the authentication process. In addition, the VPN gateway 101 may be placed in a remote location, as no direct access to the VPN gateway is required for authentication.

In the system 400 the housing of the retrieval device 100 and/or the attaching means or attachment of the retrieval device 100 is adapted to cover a portion 105 of a housing of the second device 102, wherein said portion 105 of the second device 102 comprises at least one of a flash lamp and/or a light emitting diode 102b and/or a lamp and/or a screen and/or a touchscreen 102a.

FIG. 5 is a flowchart of a method of secure authentication at a first device according to various examples.

The method comprises the following steps:

At step 1001 a second device, for example the mobile phone 102 in FIG. 4, detects that a retrieval device 100, 100a-c is connected to a light source 102. In the example of FIG. 4, the light source is the touchscreen 102a of the mobile phone 102. In the example of FIG. 4, the detection is enabled by the touchscreen 102a. The detecting 1001 comprises a determining of a contact region of the second device to which the retrieval device is connected. In the example of FIG. 4, a possible contact region 104 is indicated to the user via the touchscreen. The area of this possible contact region 104 is smaller than the useable area of the touchscreen 102a, leaving an area 103 available to display instructions to the user. The contact region 105 is then detected according to a touchscreen signal. The design of the attaching means or attachment is designed according to the specifications of touchscreens to use. For example, some touchscreens can detect up to 10 touch points simultaneously. For those touchscreens, the resolution of the touchscreen and the number of touch points can be taken into consideration when designing which part of the attaching means should be made of a material that is detectable by the touchscreen upon contact. For example, if the housing 100a has a box-like shape like the housing 100a shown in FIG. 1, the four corners in contact with the screen could be made of touch-detectable material, while the edges of the housing could be made of non-touch-detectable material. In this case, the pattern of the four contact points can be recognized by a software running on the second device 102. Many other arrangements are conceivable which take into consideration at least one of the minimum size for an element to be detectable and the required spacing between two detectable elements to be separately detectable by the touchscreen.

In step 1002, the second device 102 controls an emission of light encoding information, wherein the information comprises an authentication code for the first device.

The controlling 1002 comprises an emission of light by the second device 102 in at least a part of the contact region 105.

This may have the advantage that the second device only emits light encoding information when the retrieval device 100 is securely attached. This can have the benefit that the security configuration is easier, as no manual entry of a password or a PIN is required. It can also make the configuration faster for the user, as the time required is no longer limited by the typing speed of the user at an interface. In addition, it can make the authentication more secure, as more complex authentication information, for example longer PIN codes, may be used. In addition, the user does not learn the PIN, thereby eliminating the risk that it is written down or memorized by the user or by an observer. It can also make the authentication more reliable, as typing mistakes by the user can be eliminated.

FIG. 6 is a flowchart of a method according to various examples.

The method shown in FIG. 6 may be used for secure authentication at a first device, for example the VPN gateway 101 of FIG. 4, a field device like a medical device or any other device, which requires authentication.

The method comprises the following steps:

At step 1010, a retrieval device is physically connected to a second device. The second device has light emission capabilities. The retrieval device may be an embodiment of the retrieval devices 100 as described above. The second device may be a second device 102 as described above, for example a mobile phone or any other suited device as described above.

At step 1011, optical information is submitted by a light source of the second device.

At step 1012, the optical information is received by a light receiver of the retrieval device. The light receiver is a light receiver 100c as described above.

At step 1013, a signal indicative of the optical information is transferred via a connection means or connector of the retrieval device to the first device. The connection means or connector are the connection means or connector 100d, 100e described above.

In step 1014, the user is authenticated on the first device based on the signal.

This method may have the advantage to make the authentication process easier and faster for the user, more secure, and more reliable.

The validity of the received authentication code may be verified on the first device using verification information stored on the first device, or by accessing a user authentication server over a communication network. In another embodiment (not shown), the received authentication code is used by the first device as parameter in a cryptographic authentication and key agreement protocol, e.g. IKEv2 (Internet Key Exchange version 2), PAKE (password authenticated key agreement) or TLS AKA (transport layer security authentication and key agreement). In some examples, the first device runs the authentication and key agreement protocol to establish a cryptographic security parameter with a peer device over a communication network (e.g., Internet, mobile communications network). The authentication code may be a bitstring, a numeric PIN code, a password, a JSON web token, a cryptographic key, a key generation parameter or any other type of authentication code and/or its representation, for example a barcode, a QR code or the like.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A retrieval device for secure retrieval of optical information for a first device from a light source of a second device, the second device providing the optical information by the light source, the retrieval device comprising:
    a housing made from at least one material which is opaque for light emitted from the light source, wherein the housing is arranged to contain the light from at least a part of the light source;
    an attachment arranged to detachably attach the housing to the second device, wherein the attachment comprises at least one of a suction, a magnet, a hook-and-loop fastener, an elastic element, a rubber band, a rubber element, a spring element, and a clamping element;
    a light receiver arranged to receive the optical information from the light source, the light receiver located inside the housing; and
    a connector arranged to transfer at least one of an optical signal and an electrical signal from the light receiver to the first device such that the first device is configured to authenticate a user based on the at least one of the optical signal and the electrical signal.

2. The retrieval device of claim 1, wherein at least a part of at least one of the housing and the attachment is made of a flexible material.

3. The retrieval device of claim 1, in which at least a part of the attachment is made of a material that is detectable by a touchscreen upon contact.

4. The retrieval device of claim 1, in which the connector comprises an optical fiber comprising a first end and a second end, where the first end is the light receiver and the second end is adapted to be coupled to the first device.

5. The retrieval device of claim 1, in which the connector comprises an electrical connection and the light receiver comprises at least one light sensor.

6. The retrieval device of claim 1, in which the attachment is arranged to detachably attach to a display screen.

7. A method of secure authentication at a first device, comprising:
    providing a retrieval device including:

a housing made from at least one material which is opaque for light emitted from a light source of a second device, wherein the housing is arranged to contain the light from at least a part of the light source;

an attachment arranged to detachably attach the housing to the second device, wherein the attachment comprises at least one of a suction, a magnet, a hook-and-loop fastener, an elastic element, a rubber band, a rubber element, a spring element, and a clamping element;

a light receiver arranged to receive the optical information from the light source, the light receiver located inside the housing; and a connector arranged to transfer at least one of an optical signal and an electrical signal from the light receiver to the first device;

detecting, by the second device, that the retrieval device is connected to a light source;

controlling, by the second device, an emission of light encoding information, wherein the information comprises an authentication code for the first device;

transferring a signal indicative of the optical information via the connector of the retrieval device to the first device; and authenticating the user on the first device based on the signal.

8. The method according to claim 7, in which
the detecting comprises a determining of a contact region of the second device to which the retrieval device is connected and
wherein the controlling comprises an emission of light by the second device in at least a part of the contact region.

9. A method for secure authentication at a first device comprising:
providing a retrieval device including:
a housing made from at least one material which is opaque for light emitted from a light source of a second device, wherein the housing is arranged to contain the light from at least a part of the light source;
an attachment arranged to detachably attach the housing to the second device, wherein the attachment comprises at least one of a suction, a magnet, a hook-and-loop fastener, an elastic element, a rubber band, a rubber element, a spring element, and a clamping element;
a light receiver arranged to receive the optical information from the light source, the light receiver located inside the housing; and
a connector arranged to transfer at least one of an optical signal and an electrical signal from the light receiver to the first device;
physically connecting the retrieval device to the second device, wherein the second device has light emission capabilities;

emitting optical information by a light source of the second device;
receiving of the optical information by the light receiver of the retrieval device;
transferring a signal indicative of the optical information via the connector of the retrieval device to the first device; and
authenticating the user on the first device based on the signal.

10. The method of claim 9, in which the optical information is a flicker code.

11. A system, comprising:
a retrieval device for secure retrieval of optical information for a first device from a light source of a second device, the second device providing the optical information by the light source, the retrieval device including:
a housing made from at least one material which is opaque for light emitted from the light source, wherein the housing is arranged to contain the light from at least a part of the light source;
an attachment arranged to detachably attach the housing to the second device, wherein the attachment comprises at least one of a suction, a magnet, a hook-and-loop fastener, an elastic element, a rubber band, a rubber element, a spring element, and a clamping element;
a light receiver arranged to receive the optical information from the light source, the light receiver located inside the housing; and
a connector arranged to transfer at least one of an optical signal and an electrical signal from the light receiver to the first device such that the first device authenticates a user based on the at least one of the optical signal and the electrical signal;
the first device; and
the second device.

12. The system of claim 11, in which the second device is at least one of a mobile device, a mobile phone, a tablet, and a laptop, in which the first device is a virtual private network gateway and a field device.

13. The system of claim 11, in which at least one of the housing of the retrieval device and the attachment of the retrieval device is adapted to cover a portion of a housing of the second device, wherein the portion of the second device comprises at least one of a flash lamp, a light emitting diode, a lamp, a screen, and a touchscreen.

14. The system of claim 11, wherein the first device further comprises:
a further connector adapted to connect to the connector of the retrieval device,
a decoder to receive information transmitted by at least one of the optical and electrical signal from the retrieval device, and
an authenticator to allow access to the first device in reaction to the information.

* * * * *